US012454129B2

(12) United States Patent
Kato et al.

(10) Patent No.: US 12,454,129 B2
(45) Date of Patent: Oct. 28, 2025

(54) LIQUID EJECTION HEAD

(71) Applicant: CANON KABUSHIKI KAISHA, Tokyo (JP)

(72) Inventors: Takashi Kato, Kanagawa (JP); Yoshiyuki Nakagawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 157 days.

(21) Appl. No.: 18/235,608

(22) Filed: Aug. 18, 2023

(65) Prior Publication Data

US 2024/0059065 A1 Feb. 22, 2024

(30) Foreign Application Priority Data

Aug. 22, 2022 (JP) ................................ 2022-131916

(51) Int. Cl.

*B41J 2/145* (2006.01)
*B41J 2/14* (2006.01)
*B41J 2/175* (2006.01)

(52) U.S. Cl.

CPC ........... *B41J 2/145* (2013.01); *B41J 2/14016* (2013.01); *B41J 2/175* (2013.01)

(58) Field of Classification Search

CPC .. B41J 2/14233; B41J 2/1404; B41J 2/14145; B41J 2/18; B41J 2202/12; B41J 2002/14403; B41J 2002/14419; F04B 43/046; F04B 43/14

See application file for complete search history.

(56) References Cited

U.S. PATENT DOCUMENTS 4,746,935 A * 5/1988 Allen ..................... H04N 1/034 347/56
8,845,081 B2 9/2014 Oikawa et al.
10,421,287 B2 9/2019 Yamazaki et al.
2004/0218007 A1* 11/2004 Tomizawa ............. B41J 2/1404 347/40
2015/0124019 A1* 5/2015 Cruz-Uribe ............ B41J 29/393 347/18
2017/0087835 A1* 3/2017 Tomimatsu .......... B41J 2/14233
2020/0198350 A1* 6/2020 Kato ...................... B41J 2/1631
2020/0247120 A1* 8/2020 Mizuno ...................... B41J 2/18

FOREIGN PATENT DOCUMENTS

JP 2013-078936 A 5/2013
JP 2019-010760 A 1/2019

* cited by examiner

*Primary Examiner* — John Zimmermann
(74) *Attorney, Agent, or Firm* — Venable LLP

(57) ABSTRACT

In a liquid ejection head capable of suppressing a decrease in printing quality, circulation efficiency J at an ejection orifice on a downstream side in a flow direction in a channel is set high.

10 Claims, 9 Drawing Sheets

(a)

LIQUID EJECTION HEAD

BACKGROUND OF THE INVENTION

Field of the Invention

The present invention relates to a liquid ejection head that ejects a liquid.

Description of the Related Art

As a way to achieve high ejection orifice density in a liquid ejection head, a method has been known in which multiple ejection orifice arrays each being ejection orifices formed in an array are provided. Japanese Patent Laid-Open No. 2013-078936 discloses a liquid ejection head in which an array of small ejection orifices and an array of large ejection orifices are provided between a first supply port and a second supply port to achieve high density while also maintaining ejection characteristics.

However, in a case where an ink is simply circulated between supply ports in a configuration as disclosed in Japanese Patent Laid-Open No. 2013-078936, the ink that has been concentrated at the upstream ejection orifices flows into the downstream ejection orifices. Such a configuration has a problem that the ink gets concentrated further at the downstream ejection orifices. There is a possibility that the concentration affects the droplet landing accuracy and lowers the printing quality.

SUMMARY OF THE INVENTION

In view of the above, the present invention provides a liquid ejection head capable of suppressing a decrease in printing quality due to ink concentration.

A liquid ejection head of the present invention includes: an ejection orifice forming member in which a plurality of ejection orifices including a first ejection orifice and a second ejection orifice are formed in a form of through-holes; a substrate in which a plurality of energy generation elements are disposed, the energy generation elements being capable of generating an energy for ejecting a liquid from the plurality of ejection orifices; and a channel through which the liquid flows from the first ejection orifice toward the second ejection orifice between the ejection orifice forming member and the substrate, wherein for any of the ejection orifices, circulation efficiency J at the ejection orifice is defined as $J=H^{-0.34}\times P^{-0.66}\times W$, where H is a height [μm] of the channel on an upstream side relative to the ejection orifice in a flow direction of the liquid, P is a thickness [μm] of the ejection orifice forming member in a direction of ejection from the ejection orifice, and W is a length of an inner diameter [μm] of the ejection orifice in the flow direction of the liquid, the circulation efficiency at the second ejection orifice is higher than the circulation efficiency at the first ejection orifice, the first ejection orifice forms a first ejection orifice array arrayed in a direction crossing the flow direction of the liquid and comprises a structure serving as a filter between the adjacent first ejection orifices in the first ejection orifice array, and the second ejection orifice forms a second ejection orifice array arrayed in the direction crossing the flow direction of the liquid and comprises a structure serving as a filter between the adjacent second ejection orifices in the second ejection orifice array.

According to the present invention, it is possible to provide a liquid ejection head capable of suppressing a decrease in printing quality.

Further features of the present invention will become apparent from the following description of exemplary embodiments with reference to the attached drawings.

DESCRIPTION OF THE EMBODIMENTS

First Embodiment

A first embodiment of the present invention will be described below with reference to drawings.

Figure 1A:
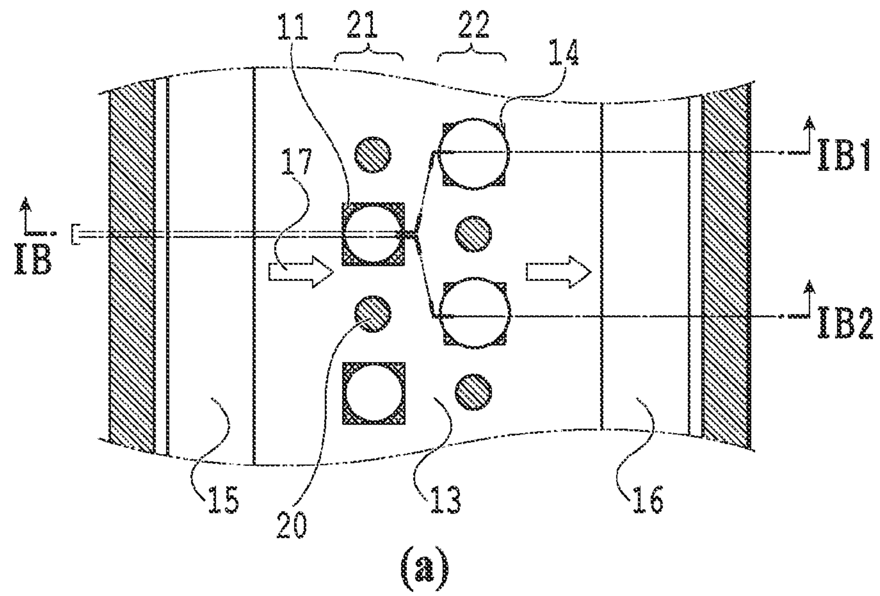
FIG. 1A is a view illustrating a liquid ejection head.
Figure 1B:
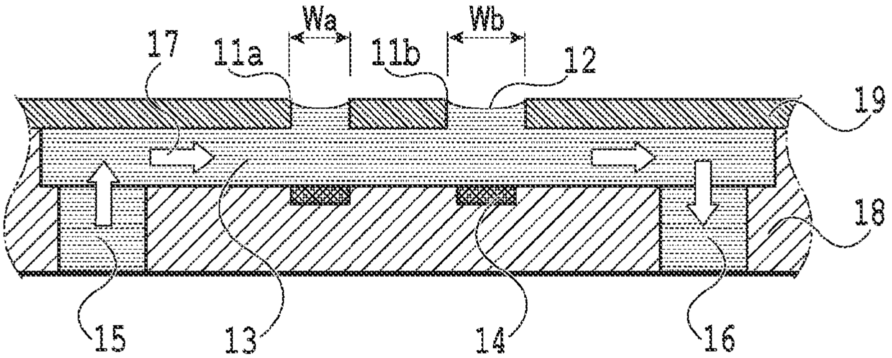
FIG. 1B is a view illustrating the liquid ejection head.
Figure 1C:
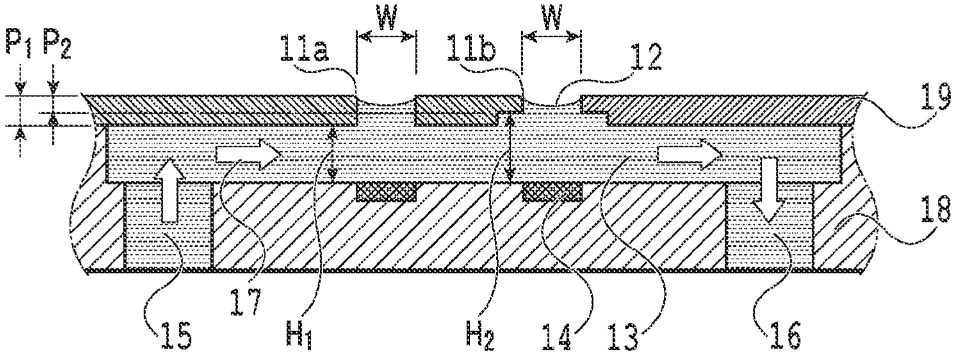
FIG. 1C is a view illustrating the liquid ejection head.

FIG. 1A is an enlarged view illustrating a liquid ejection head to which the present embodiment is applicable in the vicinity of its ejection orifices. FIG. 1B is a cross-sectional view along the IB-IB1 line in FIG. 1A. FIG. 1C is a view illustrating another configuration example of the liquid ejection head in the present embodiment. The liquid ejection head in the present embodiment includes: ejection orifices 11 for ejecting a liquid (hereinafter referred to also as "ink"); a channel 13 for supplying the liquid to the ejection orifices 11; a supply channel 15 for supplying the liquid to the channel 13; and an outlet channel 16 for collecting the liquid from the channel 13. The ejection orifices 11 are provided in the form of through-holes penetrating through an orifice plate 19. The supply channel 15 and the outlet channel 16 are provided through a substrate 18.

As the ejection orifices 11, there are provided ejection orifices 11*a* with a small ejection orifice diameter, and ejection orifices lib larger in diameter than the ejection orifices 11*a*. The ejection orifices 11*a* form an ejection orifice array 21 as an array formed in a direction crossing a circulatory flow 17. The ejection orifices 11*b* form an ejection orifice array 22 as an array formed in the direction crossing the circulatory flow 17. The liquid ejection head further includes: energy generation elements 14 that are formed under the ejection orifices in the channel 13, and generate an enemy to be used to eject the liquid; and filters (structures) 20 that keep the effect of pressure changes occurring in response to ejection from reaching the adjacent ejection orifices.

In each ejection orifice 11, a meniscus is formed on the ink, and an ejection orifice interface 12 is formed as an interface between the ink and the atmosphere. By driving the energy generation elements 14, which are electrothermal conversion elements (heaters), bubbles are generated in the liquid and eject the liquid from the ejection orifices 11. The present embodiment will be described based on an example in which heaters are used as the ejection energy generation elements, but the present invention is not limited to this example. Various energy generation elements such as piezoelectric elements, for example, are usable.

In the liquid ejection head in the present embodiment, a liquid path is formed such that the liquid flows through the supply channel 15, the channel 13, the ejection orifices 11, the channel 13, and the outlet channel 16 in this order, and this liquid path forms the circulatory flow 17. In the present embodiment, the energy generation elements 14 are driven while the ink is flowing through the channel 13 to eject droplets from the ejection orifices 11. The speed of the circulatory flow flowing through the channel 13 is, for example, about 1 to 100 mm/s, so that performing an ejection operation while the ink is flowing has only a small effect on the droplet landing accuracy and the like.

In a liquid ejection head as described above, the liquid gets branched by the filters 20 and flows through multiple flow paths. In FIG. 1A, paths IB-IB1 and IB-IB2 are illustrated with lines as examples of the paths.

In the liquid ejection head in which is formed a liquid path that forms a circulatory flow, multiple arrays of ejection orifices 11 are provided between the supply channel 15 and the outlet channel 16 as described above for the purpose of achieving high ejection orifice density. Achieving high ejection orifice density will reduce the cost of the substrate (chip) with the above-described components as compared to a liquid ejection head with the same number of ejection orifices.

To achieve high ejection orifice density, it is necessary to dispose many ejection orifices while keeping the chip size from increasing. Assuming a configuration including a single ejection orifice array with a supply channel 15 and an outlet channel 16 on its both sides as a unit configuration, the size of this unit configuration is restricted by the physical limit of the array density of the ejection energy generation elements 14 and the ejection orifices 11. In a case of providing N ejection orifice arrays, the size of the chip needs to be N times the size of the unit configuration. In contrast, with a configuration in which multiple ejection orifice arrays are disposed between a pair of a supply channel 15 and an outlet channel 16 as in FIGS. 1A and 1B, the chip size can be smaller than that in the above case. Thus, providing many ejection orifices by providing multiple ejection orifice arrays between the supply channel 15 and the outlet channel 16 while keeping the chip size from increasing is effective in achieving high ejection orifice density.

Figure 2:
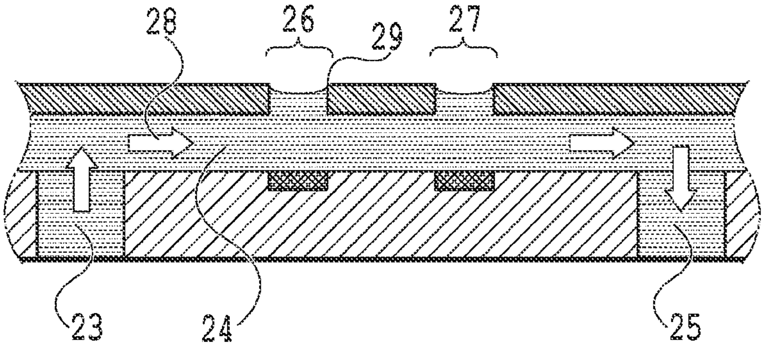
FIG. 2 is a cross-sectional view illustrating a general liquid ejection head.

FIG. 2 is a cross-sectional view illustrating a general liquid ejection head with a configuration in which multiple ejection orifice arrays are provided between a supply channel and an outlet channel and an ink is circulated therethrough.

As a rule, the effect of increasing the number of ejection orifice arrays is prominent, such as density unevenness at the beginning of printing due to ink concentration and an increase in the number of droplets to be preliminarily ejected for solving the concentration. However, a configuration that generates a circulatory flow suppresses this effect.

In the configuration illustrated in FIG. 2, two ejection orifice arrays 26 and 27 are formed on a channel 24 between a supply channel 23 and an outlet channel 25. A circulatory flow 28 having flowed into the ejection orifice array 26 closer to the supply channel 23 flows into the ejection orifice array 27 closer to the outlet channel 25. The ink having flowed into the ejection orifice arrays gets concentrated as it contacts the atmosphere at the ejection orifices 29. Specifically, the circulatory flow 28 having flowed into the ejection orifice array 27 has been concentrated to a greater extent than the circulatory flow 28 having flowed into the ejection orifice array 26, so that the downstream ejection orifice array 27 is more susceptible to ink concentration.

Figure 3:
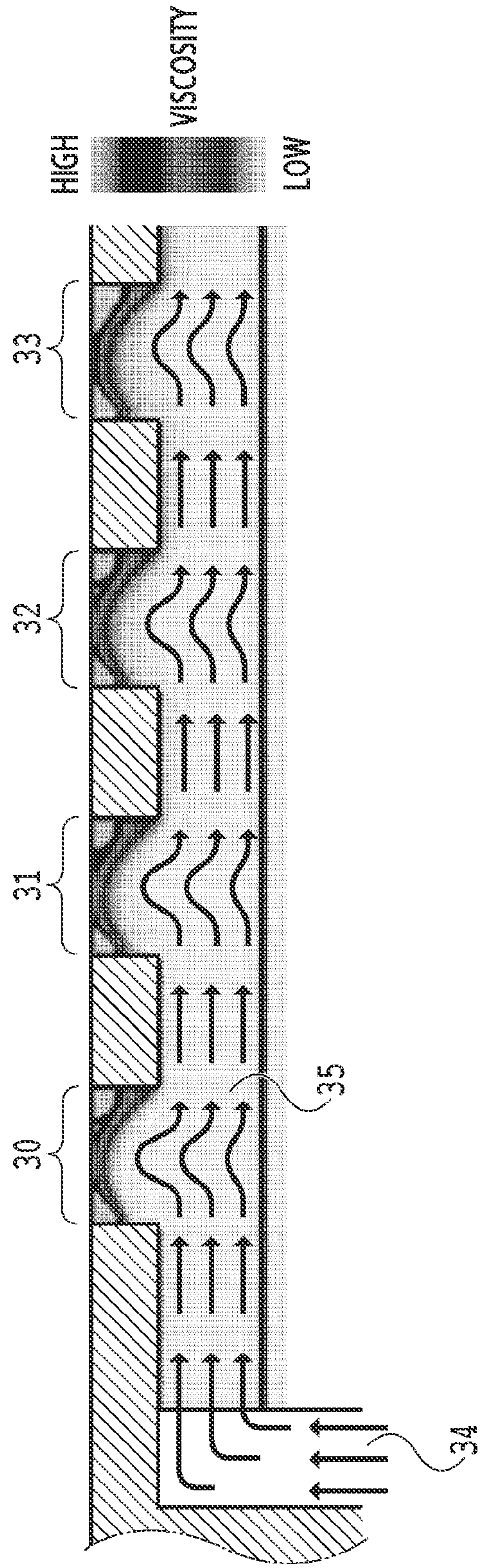
FIG. 3 is a cross-sectional view illustrating a liquid ejection head with four ejection orifice arrays.

FIG. 3 is a cross-sectional view illustrating a liquid ejection head with four ejection orifice arrays between a supply channel and an outlet channel. In the liquid ejection head in FIG. 3, a liquid having flowed in from a supply channel 34 flows in a channel 35 through an ejection orifice array 30, an ejection orifice array 31, an ejection orifice array 32, and an ejection orifice array 33 in this order. The liquid gets concentrated more and more as it moves from the upstream side toward the downstream side through each ejection orifice array. This is prominent especially near the boundary with the atmosphere in each ejection orifice. The density of the liquid increases near each ejection orifice. The concentration progresses toward the downstream side, and the density of the liquid reaches highest at the most downstream ejection orifice array.

As described above, in a liquid ejection head through which a liquid is circulated and in which multiple ejection orifice arrays are provided between a supply channel and an outlet channel in order to achieve high ejection orifice density, the liquid may be concentrated at a downstream ejection orifice array(s). The liquid concentration may result in a failure to obtain a desired ejection condition. Also, this effect gets greater the larger the number of ejection orifice arrays between the supply channel and the outlet channel and the farther the liquid gets toward the downstream side.

To address this, in the present embodiment, circulation efficiency J is defined as an index indicating the efficiency of replacement of the ink, and the configuration is designed such that the circulation efficiency J is high at a downstream ejection orifice array.

Now, the circulation efficiency J will be described.

Figure 4A:
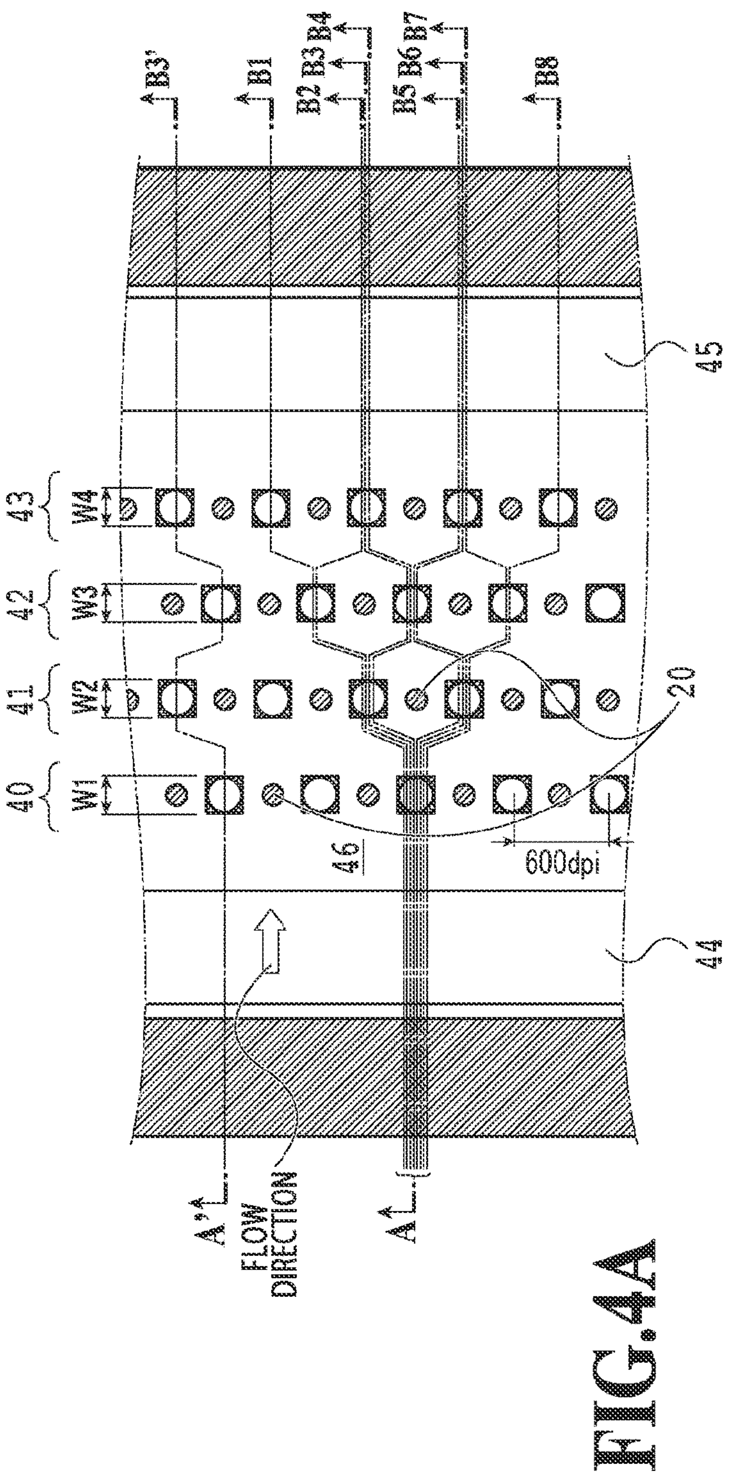
FIG. 4A is a view illustrating an arrangement of ejection orifices and a circulatory flow in a liquid ejection head.
Figure 4B:
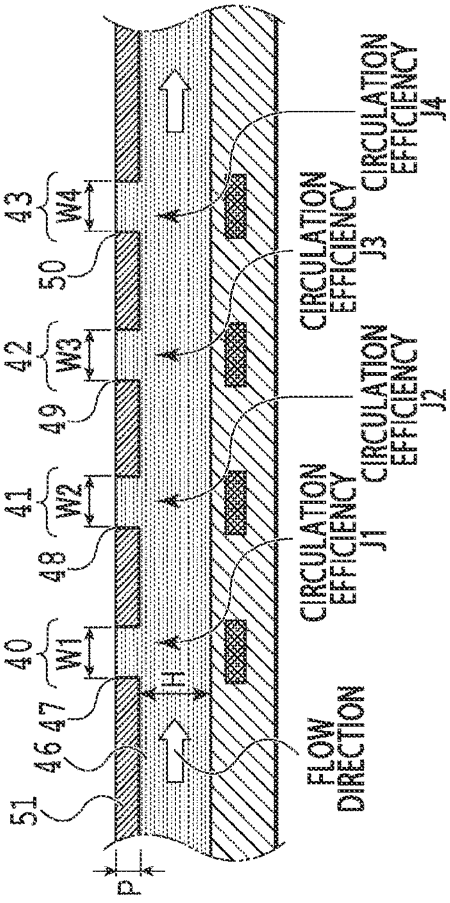
FIG. 4B is a view illustrating the arrangement of ejection orifices and the circulatory flow in the liquid ejection head.

FIGS. 4A and 4B are views explaining the circulation efficiency J and illustrating an arrangement of ejection orifices and a circulatory flow in a liquid ejection head. The configuration in FIGS. 4A and 4B is such that a liquid having flowed in from a supply channel 44 flows through an ejection orifice array 40, an ejection orifice array 41, an ejection orifice array 42, and an ejection orifice array 43 in this order, and flows out from an outlet channel 45. The ejection orifices in the ejection orifice arrays 40, 4L 42, and 43 are arrayed at a resolution of 600 dpi in the array direction (the vertical direction in FIG. 4A).

FIG. 4A illustrates eight fluid paths A-B1, A-B2, A-B3, A-B4, A-B5, A-B6, A-B7, and A-B8. FIG. 4A also illustrates a line A'-B3' indicating a cross section. Inside the liquid ejection head, the circulatory flow passes an upstream ejection orifice array and then gets branched by structures (filters) 20 provided between adjacent ejection orifices in the downstream array. The circulatory flow thus branched gets further branched on the downstream side. Thus, the circulatory flow flowing through the liquid ejection head flows from the upstream side to the downstream side while repeatedly getting branched as many times as the number of ejection orifice arrays.

FIG. 4B illustrates a cross section along the A'-B3' line in FIG. 4A. As illustrated in FIG. 4B, suppose that the height of a channel 46 on an upstream side in the flow direction of the liquid inside the channel is H [μm], and the thickness of an ejection orifice forming member 51 in which ejection orifices 47, 48, 49, and 50 are formed (the length in the ejection direction of the liquid) is P [μm]. Suppose also that the length of the inner diameter of the ejection orifices 47, 48, 49, and 50 in the flow direction of the liquid inside the channel 46 is W [μm]. With these, the circulation efficiency J is defined as below.

$$J=H^{-0.34}\times P^{-0.66}\times W \quad \text{(Equation 1)}$$

It has been confirmed that the higher this circulation efficiency J, the higher the efficiency of replacement of the liquid in the ejection orifice, and the less likely ejection is affected by thickening. In case where there are multiple ejection orifice arrays, this circulation efficiency J can be calculated for each ejection orifice in each ejection orifice array. The replacement of the liquid in an ejection orifice is affected by the height of the channel at a point where the liquid flows into the ejection orifice. Thus, the height H of the channel 46 to be used is the height on an upstream side in the flow direction of the liquid in the channel 46 from which the liquid flows into a channel for the ejection orifice.

Now, refer back to FIG. 1. In the present embodiment, in the circulatory flow inside the liquid ejection head, the circulation efficiency J at each ejection orifice array is adjusted by varying the upstream ejection orifices and the downstream ejection orifices in width. As illustrated in FIG. 1B, a width Wb of the downstream ejection orifices 11*b* is set greater than a width Wa of the upstream ejection orifices 11*a* to make the circulation efficiency J higher for the downstream ejection orifices 11*b* than for the upstream ejection orifices 11*a*. With such a configuration, the ejection orifices 11*a* and 11*b* differ in ejection volume, and therefore there are two ejection volumes Vd. The two ejection volumes Vd enable finer tone representations with ejected ink droplets.

The following description will be given based on a configuration that raises the circulation efficiency J of certain ejection orifices by changing their width W. However, it is possible to employ another configuration that raises the circulation efficiency J. For example, this can be achieved by, as illustrated in FIG. 1C, setting the ejection orifice widths W of the ejection orifices 11*a* and 11*b* to the same value, and varying the channel height H and the length P of each ejection orifice portion while keeping the sum of the channel height H and the length P of each ejection orifice portion at the same value. Specifically, the circulation efficiency J can be raised also by varying the channel height H and the length P of each ejection orifice portion while maintaining a relationship $H_1+P_1=H_2+P_2$. With this configuration, the ejection volume Vd from each ejection orifice is the same. Hence, the circulation efficiency J for the downstream nozzles can be raised with a configuration using a single ejection volume Vd.

It has been confirmed that, with the circulation efficiency J>17, the efficiency of replacement of the liquid in an ejection orifice for use in ejection is good and the ejection is less likely to be affected by thickening. To maintain good replacement efficiency, the flow speed of the liquid in the channel 13 is desirably 1 to 100 [mm/s].

It suffices that the ejection orifices corresponding to at least one flow path are such that the circulation efficiency J is higher at an upstream ejection orifice than at a downstream ejection orifice.

By making the circulation efficiency J higher at a downstream ejection orifice array as in the present embodiment, it is possible to suppress progress of concentration of the liquid at the downstream ejection orifice array. Incidentally, one may conceive of a configuration in which the circulation efficiency J is raised as much as possible and equally set for all ejection orifice arrays to address substantial deterioration in the circulation efficiency J on the downstream side. However, in the case where the circulation efficiency J is raised as much as possible, the ink that has concentrated due to evaporation will efficiently flow to the downstream side. Accordingly, the concentration of the entirety of the ink is likely to progress. For this reason, it is not desirable to simply raise the circulation efficiency J but is desirable to set it to a necessary value.

As described above, the circulation efficiency J at downstream ejection orifices in the flow direction in the channel is set higher than the circulation efficiency J at upstream ejection orifices. This makes it possible to provide a liquid ejection head capable of suppressing a decrease in printing quality.

Second Embodiment

A second embodiment of the present invention will be described below with reference to a drawing. Note that the basic configuration in the present embodiment is similar to that in the first embodiment, and the characteristic configuration will therefore be described below.

Figure 5:
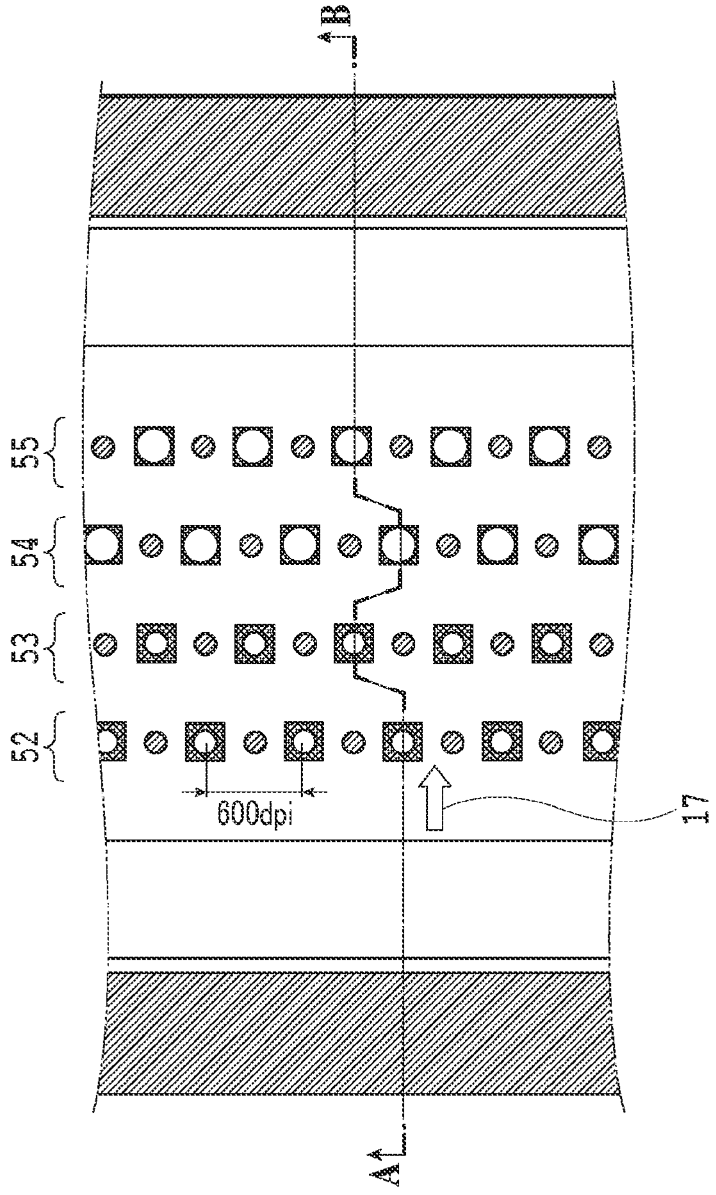
FIG. 5 is a schematic view illustrating an arrangement of ejection orifices in a liquid ejection head.

FIG. 5 is a schematic view illustrating an arrangement of ejection orifices in a liquid ejection head in the present embodiment. The liquid ejection head in the present embodiment includes four ejection orifice arrays 52, 53, 54, and 55. Of the four ejection orifice arrays 52, 53, 54, and 55, the two ejection orifice arrays 52 and 53 on the upstream side of the flow of a circulatory flow include small-diameter ejection orifices while the two ejection orifice arrays 54 and 55 on the downstream side include large-diameter ejection orifices. That is, the configuration is such that the ejection orifice diameters are small, small, large, and large in this order from the upstream side toward the downstream side. To describe this in terms of the relationship in circulation efficiency, the ejection orifices from the upstream side toward the downstream side satisfy a relationship "J1=J2<J3=J4".

Employing this configuration offers two advantages. One is that there are two ejection orifice arrays with small-diameter ejection orifices (orifice arrays 52 and 53) and two ejection orifice arrays with large-diameter ejection orifices (ejection orifice arrays 54 and 55), and each ejection orifice array increases the resolution. The other is that the circulation efficiency J is high at the two downstream arrays, which are more susceptible to concentration.

Third Embodiment

A third embodiment of the present invention will be described below with reference to a drawing. Note that the basic configuration in the present embodiment is similar to that in the first embodiment, and the characteristic configuration will therefore be described below.

Figure 6:
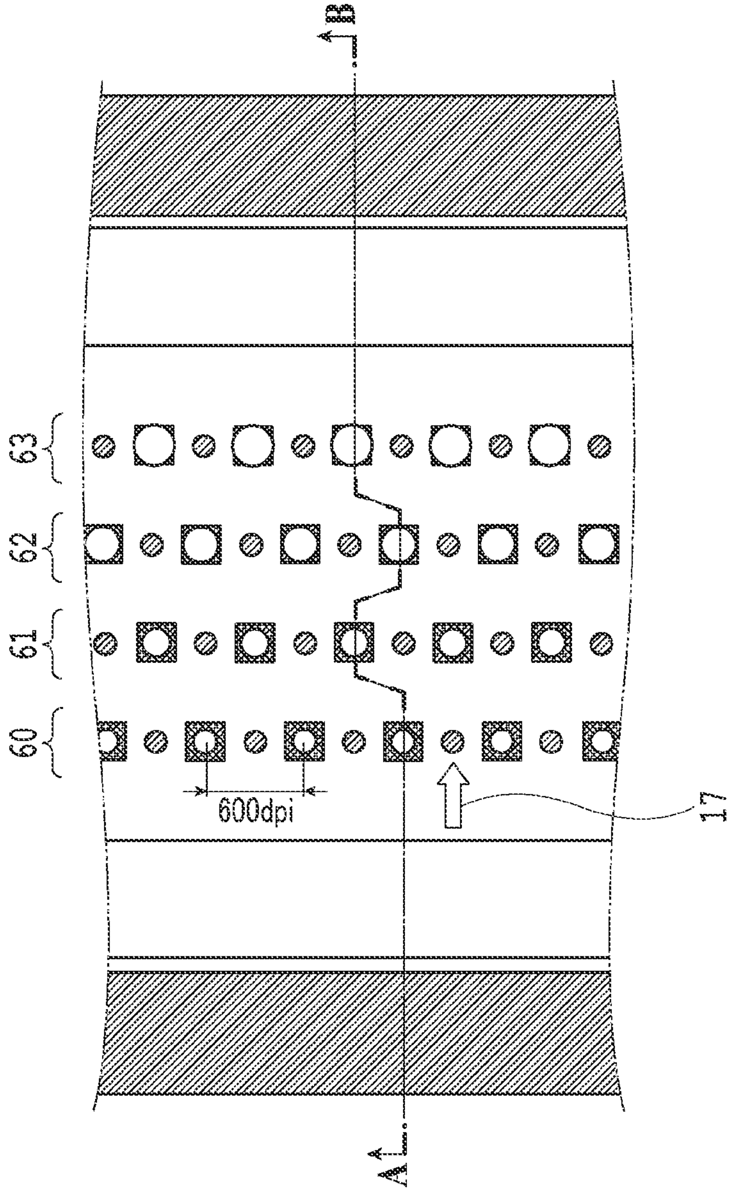
FIG. 6 is a schematic view illustrating an arrangement of ejection orifices in a liquid ejection head.

FIG. 6 is a schematic view illustrating an arrangement of ejection orifices in a liquid ejection head in the present embodiment. The liquid ejection head in the present embodiment includes four ejection orifice arrays 60, 61, 62, and 63. The most upstream ejection orifice array 60 in a circulatory flow includes ejection orifices with a small diameter. The ejection orifice array 61 includes ejection orifices with a medium diameter larger than the small diameter. The ejection orifice array 62 includes ejection orifices with a large diameter larger than the middle-diameter ejection orifices. The most downstream ejection orifice array 63 includes ejection orifices with a very large diameter larger than the large diameter. That is, the configuration is such that the ejection orifice diameters are small, medium, large, and very large in this order from the upstream side toward the downstream side. To describe this in terms of the relationship in circulation efficiency, the ejection orifices from the upstream side toward the downstream side satisfy a relationship "J1<J2<J3<J4".

An advantage of employing this configuration is that four ejection volumes enable finer tone representations with ejected ink droplets. A further advantage is that the circulation efficiency J gradually rises toward the downstream side, which is more susceptible to concentration.

Fourth Embodiment

A fourth embodiment of the present invention will be described below with reference to a drawing. Note that the basic configuration in the present embodiment is similar to that in the first embodiment, and the characteristic configuration will therefore be described below.

Figure 7:
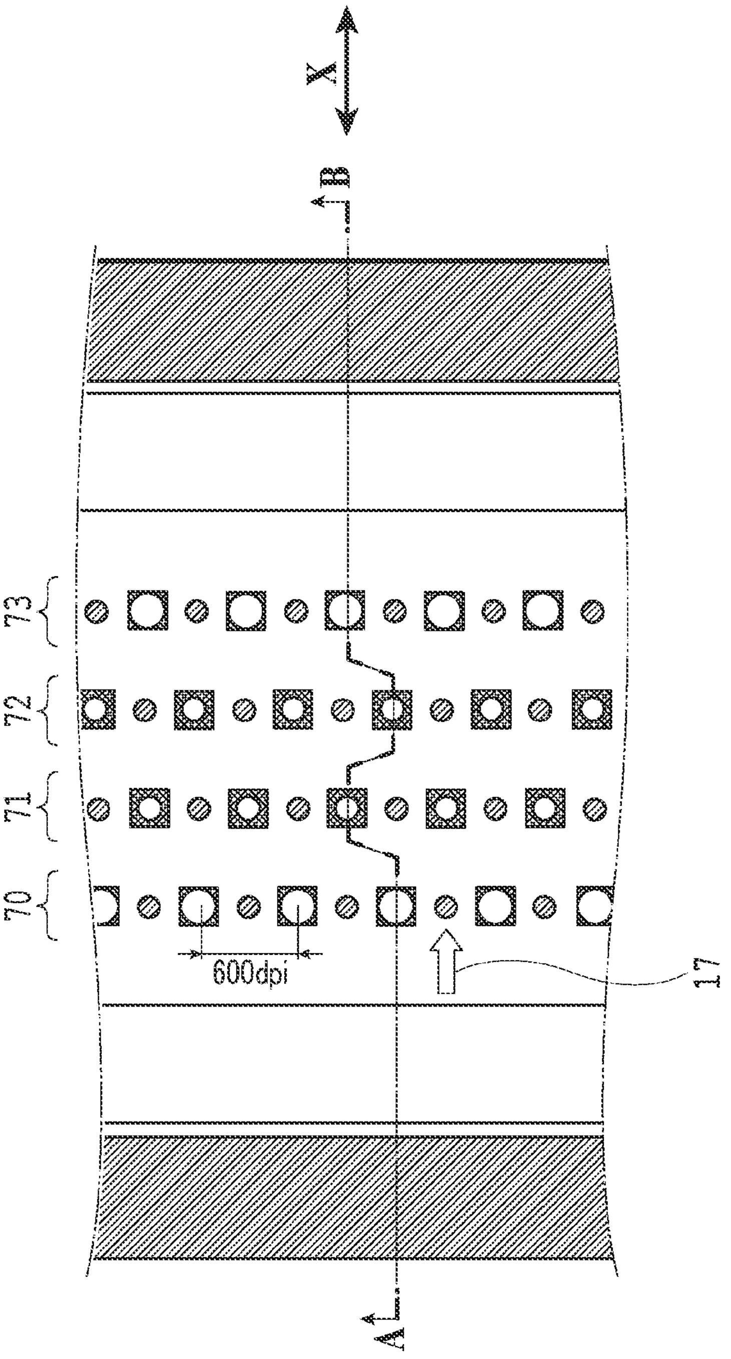
FIG. 7 is a schematic view illustrating an arrangement of ejection orifices in a liquid ejection head.

FIG. 7 is a schematic view illustrating an arrangement of ejection orifices in a liquid ejection head in the present embodiment. The liquid ejection head in the present embodiment includes four ejection orifice arrays 70, 71, 72, and 73. The most upstream ejection orifice array 70 in a circulatory flow includes large-diameter ejection orifices. The ejection orifice array 71 includes small-diameter ejection orifices. The ejection orifice array 72 includes small-diameter ejection orifices. The most downstream ejection orifice array 73 includes large-diameter ejection orifices. Thai is, the configuration is such that the ejection orifice diameters are large, small, small, and large in this order from the upstream side toward the downstream side. To describe this in terms of the relationship in circulation efficiency, the ejection orifices from the upstream side toward the downstream side satisfy a relationship "J1>J2=J3<J4, J1=J4".

An advantage of employing this configuration is that the circulation efficiency J rises from the center toward the most downstream side, allowing the circulation efficiency J to be highest at the most downstream array, which is most susceptible to concentration, while the ejection volume from the liquid ejection head is bilaterally symmetrical, allowing ordered droplet formation.

Fifth Embodiment

A fifth embodiment of the present invention will be described below with reference to a drawing. Note that the basic configuration in the present embodiment is similar to that in the first embodiment, and the characteristic configuration will therefore be described below.

Figure 8:
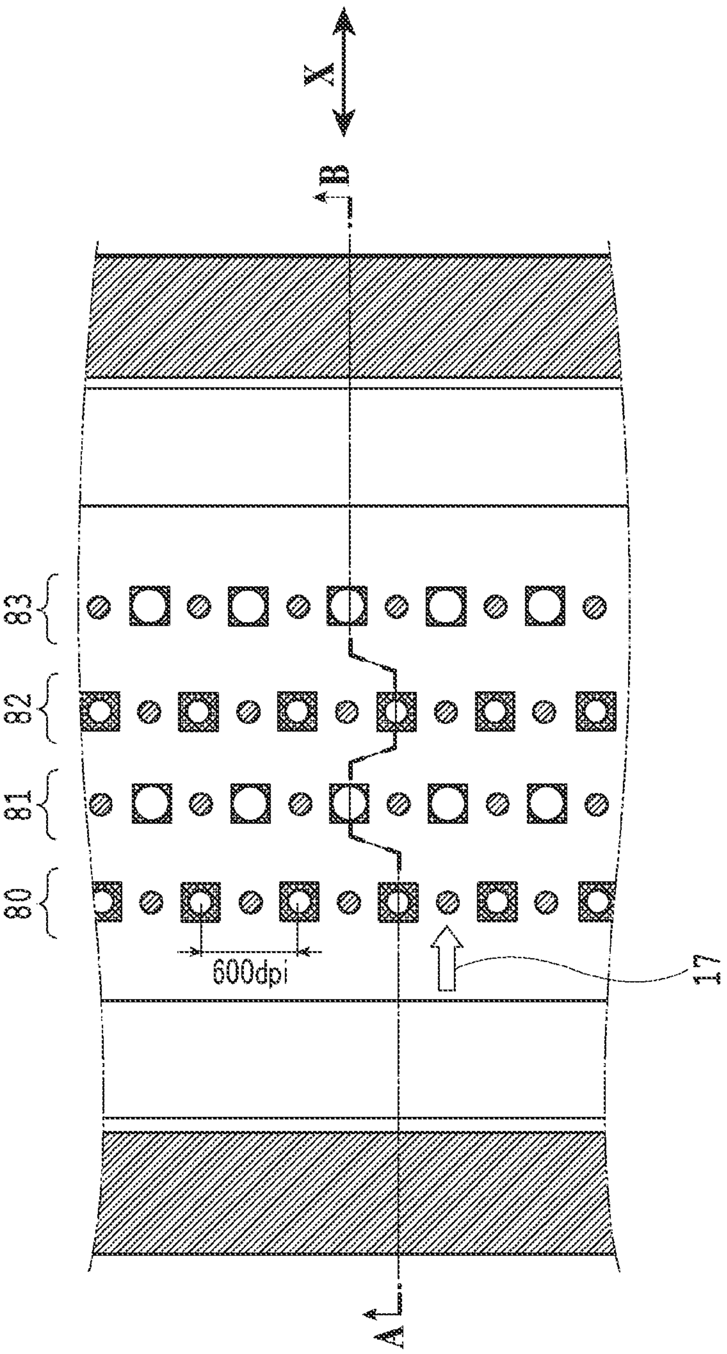
FIG. 8 is a schematic view illustrating an arrangement of ejection orifices in a liquid ejection head.

FIG. 8 is a schematic view illustrating an arrangement of ejection orifices in a liquid ejection head in the present embodiment. The liquid ejection head in the present embodiment includes four ejection orifice arrays 80, 81, 82, and 83. The most upstream ejection orifice array 80 in the direction of a circulatory flow includes ejection orifices with a small diameter. The ejection orifice array 81 includes large-diameter ejection orifices. The ejection orifice array 82 includes small-diameter ejection orifices. The most downstream ejection orifice array 83 includes large-diameter ejection orifices. That is, the configuration is such that the ejection orifice diameters are small, large, small, and large in this order from the upstream side toward the downstream side. To describe this in terms of the relationship in circulation efficiency, the ejection orifices from the upstream side toward the downstream side satisfy a relationship "J1<J2, J3<J4, J1=J3, J2=J4".

An advantage of employing this configuration is that the circulation efficiency J is highest at the most downstream array, which is most susceptible to concentration on the downstream side. A further advantage is that small-diameter ejection orifices are not adjacent to each other in the flow direction of a circulatory flow, and large-diameter ejection orifices are not adjacent to each other in the flow direction. This suppresses a crosstalk phenomenon which affects the ejection from adjacent ejection orifices in an X direction.

Other Embodiments

The configurations in FIGS. 1B and 1C may be combined. For example, in FIG. 5 (second embodiment) and FIG. 8 (fifth embodiment), "J1<J2<J3<J4" can be achieved by adjusting the height H and the length P at each ejection orifice array.

In each of the above embodiments, a description has been given of a configuration in which the liquid ejection head is provided with a single supply channel 15 and a single outlet channel 16 each having the shape of an elongated hole. However, the present invention is not limited to this configuration. Specifically, the configuration may be such that an elongated hole is partitioned by multiple walls into multiple supply channels 15, and an elongated hole is partitioned by multiple walls into multiple outlet channels 16.

Modification

A modification of the present invention will be described below with reference to a drawing. The basic configuration in the present modification is similar to that in the first embodiment, and the characteristic configuration will therefore be described below.

Figure 9:
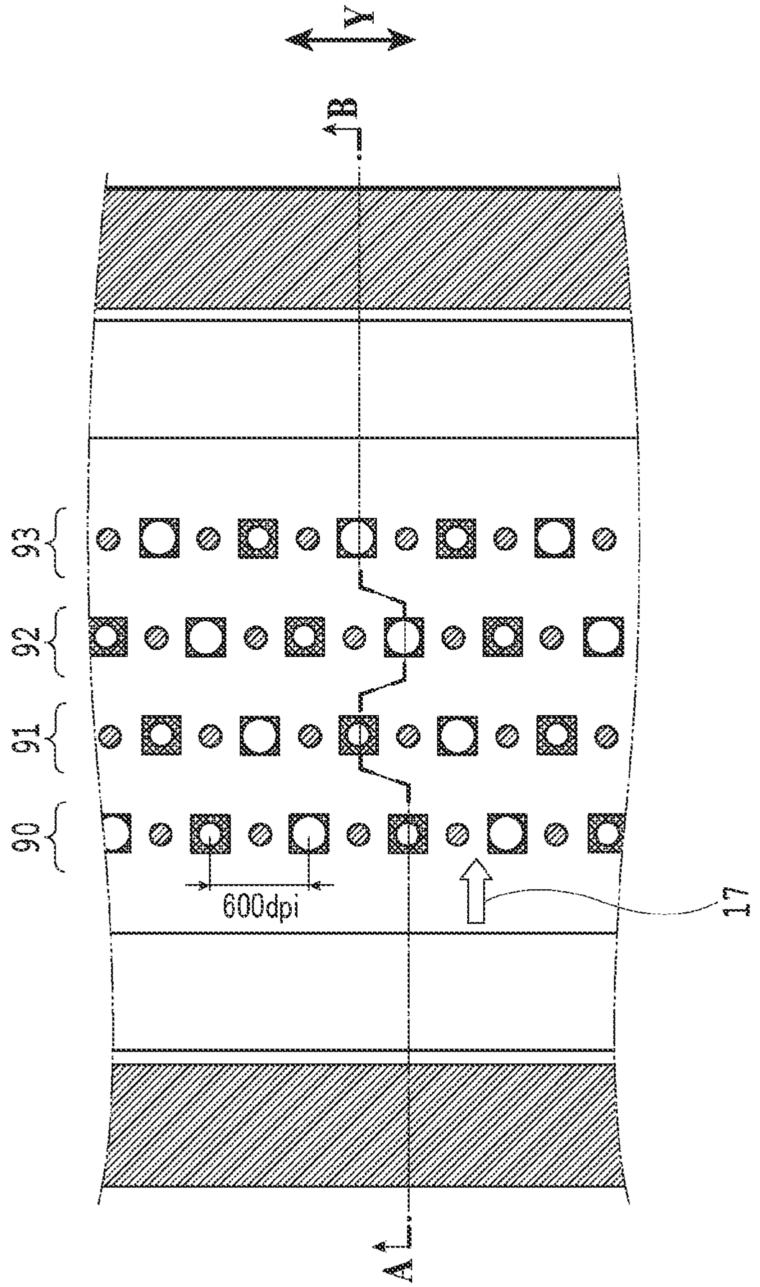
FIG. 9 is a schematic view illustrating an arrangement of ejection orifices in a liquid ejection head.

FIG. 9 is a schematic view illustrating an arrangement of ejection orifices in a liquid ejection head in the present modification. The liquid ejection head in the present modification includes four ejection orifice arrays 90, 91, 92, and 93. In the present modification, the configuration is such that ejection orifices of the same size are not adjacent to one another in a Y direction (the array direction of the ejection orifices in each ejection orifice array). Moreover, the configuration is such that the ejection orifice diameters are small, small, large, and large in this order from the upstream side toward the downstream side in certain portions of the circulatory flow. To describe this in terms of the relationship in circulation efficiency, the ejection orifices from the upstream side toward the downstream side satisfy a relationship "J1=J2<J3=J4". In the present modification, combinations of arrangements other than the arrangement of ejection orifices described above are possible as well.

An advantage of employing this configuration is that the relationship in circulation efficiency is improved on the downstream as compared to the upstream side. A further advantage is that small-diameter ejection orifices are not adjacent to one another in the Y direction and large-diameter ejection orifices are not adjacent to one another in the Y direction. This suppresses a crosstalk phenomenon which affects the ejection from adjacent ejection orifices in the Y direction.

In the above embodiments and modification, the liquid ejection head does not include channel walls that form individual pressure chambers, and many ejection orifices are disposed densely. While such a configuration has a feature that allows very high refill performance, the interference (crosstalk) between ejection orifices is strong, which can be a concern. A configuration capable of minimizing the crosstalk is preferable.

In a case where the ink viscosity is high (viscosity $\eta$ is approximately 8 cp), the crosstalk itself is low. In a case where the ink viscosity is moderate (viscosity $\eta$ is approximately 4 cp), it is necessary to take a further crosstalk reduction measure. In the above embodiments and modification, the filters 20 (see FIG. 1A) are disposed between the ejection orifices in each ejection orifice array. Filters may be disposed between the ejection orifice arrays, for example, as a further crosstalk reduction measure. This configuration is more preferable in the case where the ink viscosity is moderate.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-131916 filed Aug. 22, 2022, which is hereby incorporated by reference herein in its entirety.

What is claimed is:

1. A liquid ejection head comprising:

an ejection orifice forming member in which a plurality of ejection orifices including a first ejection orifice and a second ejection orifice are formed in a form of through-holes;

a substrate in which a plurality of energy generation elements are disposed, the energy generation elements being capable of generating energy for ejecting a liquid from the plurality of ejection orifices; and a channel through which the liquid flows from the first ejection orifice toward the second ejection orifice between the ejection orifice forming member and the substrate, wherein for any of the ejection orifices, circulation efficiency J at the ejection orifice is defined as:

$$J=H^{-0.34}\times P^{-0.66}\times W,$$

where H is a height [μm] of the channel on an upstream side relative to the ejection orifice with respect to a flow direction of the liquid, P is a thickness [μm] of the ejection orifice forming member in a direction of ejection from the ejection orifice, and W is a length of an inner diameter [μm] of the ejection orifice in the flow direction of the liquid, the circulation efficiency at the second ejection orifice is higher than the circulation efficiency at the first ejection orifice, the first ejection orifice is provided in plural and forms a first ejection orifice array arrayed in a direction crossing the flow direction of the liquid and comprises a structure serving as a filter between the adjacent first ejection orifices in the first ejection orifice array, and the second ejection orifice is provided in plural and forms a second ejection orifice array arrayed in the direction crossing the flow direction of the liquid and comprises a structure serving as a filter between the adjacent second ejection orifices in the second ejection orifice array.

2. The liquid ejection head according to claim 1, further comprising:

a supply channel through which the liquid is supplied to the channel; and an outlet channel through which the liquid is caused to flow out of the channel.

3. The liquid ejection head according to claim 2, further comprising a third ejection orifice array arrayed in the direction crossing the flow direction of the liquid and a fourth ejection orifice array arrayed in the direction crossing the flow direction of the liquid between the supply channel and the outlet channel, wherein the circulation efficiencies J defined as J1, J2, J3, and J4 in order from an ejection orifice in the ejection orifice array on an upstream side with respect to a flow of the liquid satisfy a relationship J1=J2<J3=J4.

4. The liquid ejection head according to claim 2, further comprising a third ejection orifice array arrayed in the direction crossing the flow direction of the liquid and a fourth ejection orifice array arrayed in the direction crossing the flow direction of the liquid between the supply channel and the outlet channel, wherein the circulation efficiencies J defined as J1, J2, J3, and J4 in order from an ejection orifice in the ejection orifice array on an upstream side with respect to a flow of the liquid satisfy a relationship J1<J2<J3<J4.

5. The liquid ejection head according to claim 2, further comprising a third ejection orifice array arrayed in the direction crossing the flow direction of the liquid and a fourth ejection orifice array arrayed in the direction crossing the flow direction of the liquid between the supply channel and the outlet channel, wherein the circulation efficiencies J defined as J1, J2, J3, and J4 in order from an ejection orifice in the ejection orifice array on an upstream side with respect to a flow of the liquid satisfy a relationship J1>J2=J3<J4 and J1=J4.

6. The liquid ejection head according to claim 2, further comprising:

a third ejection orifice array arrayed in the direction crossing the flow direction of the liquid and a fourth ejection orifice array arrayed in the direction crossing the flow direction of the liquid; and a structure serving as a filter also between the adjacent ejection orifices in the third ejection orifice array and the fourth ejection orifice array, wherein the ejection orifices in at least one flow path among a plurality of flow paths formed by branching a flow of the liquid with the filter are such that the circulation efficiency J at an ejection orifice on a downstream side is higher than the circulation efficiency J at an ejection orifice on an upstream side.

7. The liquid ejection head according to claim 1, wherein the circulation efficiency J is changed by changing the length W.

8. The liquid ejection head according to claim 1, wherein the circulation efficiency J at the ejection orifice satisfies J>1.7.

9. The liquid ejection head according to claim 1, wherein a flow speed of the liquid in the channel is 1 mm/s to 100 mm/s.

10. The liquid ejection head according to claim 2, wherein each ejection orifice in the first ejection orifice array is arrayed at a resolution of 600 dpi.

* * * * *